(12) United States Patent
Kim et al.

(10) Patent No.: US 9,235,709 B2
(45) Date of Patent: Jan. 12, 2016

(54) INTEGRITY PROTECTION METHOD AND APPARATUS FOR MOBILE TERMINAL

(71) Applicant: Samsung Electric Co. Ltd., Suwon-si, Gyeonggi-do (KR)

(72) Inventors: Bumhan Kim, Seoul (KR); Sunghoon Yoo, Suwon-si (KR); Kyunghee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 13/774,435

(22) Filed: Feb. 22, 2013

(65) Prior Publication Data

US 2013/0227264 A1 Aug. 29, 2013

(30) Foreign Application Priority Data

Feb. 24, 2012 (KR) .................. 10-2012-0019095

(51) Int. Cl.
*G06F 21/00* (2013.01)
*G06F 21/57* (2013.01)

(52) U.S. Cl.
CPC .................. *G06F 21/575* (2013.01)

(58) Field of Classification Search
None
See application file for complete search history.

(56) References Cited

U.S. PATENT DOCUMENTS

| | | | | |
|---|---|---|---|---|
| 6,986,052 B1* | 1/2006 | Mittal | ................. | G06F 12/1441 711/E12.097 |
| 7,305,534 B2* | 12/2007 | Watt | .................... | G06F 9/30181 711/163 |
| 7,500,098 B2* | 3/2009 | Paatero | .................. | 713/165 |
| 7,584,350 B2* | 9/2009 | Kuhls et al. | ...................... | 713/2 |
| 7,676,665 B2* | 3/2010 | Wyatt | .................... | G06F 9/4411 713/1 |
| 7,725,703 B2* | 5/2010 | Hunter | .................. | G06F 21/575 380/259 |
| 7,793,347 B2* | 9/2010 | Rozas | ............................. | 726/22 |
| 8,281,116 B2* | 10/2012 | Rothman | .............. | G06F 9/4401 713/2 |
| 8,375,221 B1* | 2/2013 | Thom et al. | .................... | 713/189 |
| 8,413,209 B2* | 4/2013 | Aldera | ................. | H04L 63/102 713/185 |
| 8,549,275 B2* | 10/2013 | Mittal | ................. | G06F 12/1441 713/2 |
| 8,619,971 B2* | 12/2013 | Kurien | .................. | G06F 9/5077 380/257 |
| 8,732,824 B2* | 5/2014 | Arbaugh et al. | ................ | 726/22 |
| 8,806,220 B2* | 8/2014 | Abzarian | ................ | G06F 21/57 713/187 |
| 2008/0045342 A1* | 2/2008 | Crowder et al. | ................ | 463/42 |
| 2011/0131447 A1* | 6/2011 | Prakash et al. | ............. | G06F 8/65 714/19 |
| 2012/0102313 A1* | 4/2012 | Nicolson | .............. | G06F 21/575 713/2 |
| 2012/0216242 A1* | 8/2012 | Uner et al. | ........................ | 726/1 |
| 2012/0290870 A1* | 11/2012 | Shah et al. | .................... | 714/4.11 |

OTHER PUBLICATIONS

Piromsopa, Krerk; Enbody, Richard J. Secure Bit: Transparent, Hardware Buffer-Overflow Protection. IEEE Transactions on Dependable and Secure Computing. vol. 3, Issue: 4. Pub. Date: 2006. Relevant pp. 365-376. http://ieeexplore.ieee.org/stamp/stamp.jsp?tp=&arnumber=4012648.*

(Continued)

*Primary Examiner* — Jeremiah Avery
(74) *Attorney, Agent, or Firm* — Jefferson IP Law, LLP

(57) ABSTRACT

A method and apparatus for protecting the integrity of a mobile terminal are provided. The mobile terminal includes a secure world for preventing unauthorized access to resources, and a normal world other than the secure world. The integrity protection method for the mobile terminal includes sensing a power-on of the mobile terminal, verifying, by a trusted entity in the normal world, the integrity of a first subsequent entity, and sending, when an integrity breach is detected in the first subsequent entity, by the trusted entity, a modification indication signal to the secure world.

19 Claims, 7 Drawing Sheets

(56) References Cited

OTHER PUBLICATIONS

Li, Ninghui; Mao, Ziqing; Chen, Hong. Usable Mandatory Integrity Protection for Operating Systems. IEEE Symposium on Security and Privacy, 2007. Pub. Date: 2007. Relevant pp. 164-178. http://ieeexplore.ieee.org/stamp/stamp.jsp?tp=&arnumber=4223222.*

Drusinsky, Doron; Michael, James Bret; Otani, Thomas W.; Shing, Man-Tak, Wijesekera, Duminda. Computer-Assisted Validation and Verification of Cybersecurity Requirements. 2010 IEEE International Conference on Technologies for Homeland Security (HST). Relevant pp. 93-98. http://ieeexplore.ieee.org/stamp/stamp.jsp?tp=&arnumber=5655087.*

Liang, Hongliang; Sun, Yufang. Enforcing Mandatory Integrity Protection in Operating System. 2001 International Conference on Computer Networks and Mobile Computing. Relevant pp. 435-440. http://ieeexplore.ieee.org/stamp/stamp.jsp?tp=&arnumber=962629.*

* cited by examiner

US 9,235,709 B2

INTEGRITY PROTECTION METHOD AND APPARATUS FOR MOBILE TERMINAL

PRIORITY

This application claims the benefit under 35 U.S.C. §119(a) of a Korean patent application filed on Feb. 24, 2012 in the Korean Intellectual Property Office and assigned Serial No. 10-2012-0019095, the entire disclosure of which is hereby incorporated by reference.

BACKGROUND OF THE INVENTION

1. Field of the Invention

The present invention relates to a mobile terminal More particularly, the present invention relates to a method and an apparatus for protecting the integrity of a mobile terminal.

2. Description of the Related Art

In addition to traditional communication functions related to calls and messages, advanced mobile terminals provide various other functions related to, for example, money transfer, stock trading, content playback and gaming.

When a mobile terminal is powered on, it starts to boot by loading the Operating System (OS). In secure booting, a pre-verified entity verifies subsequent entities and executes them only if their security is assured (i.e., not modified). This secure booting is used to detect a modification made to the operating system and the kernel, or malicious code in the mobile terminal, so as to prevent damage to the user and protect intellectual property rights.

However, some mobile terminals apply a secure boot chain only up to a bootloader. Such mobile terminals may boot even after their kernels are modified, and cannot ensure a secure boot. Malicious code installed in mobile terminals with an unsecure boot chain may disturb normal operations, and may allow for the personal or financial information of users to be stolen. This may also override Digital Rights Management (DRM) features, which enforce proper payment for digital content.

Hence, it is necessary to develop a method that can ensure integrity of entities in a mobile terminal.

SUMMARY OF THE INVENTION

Aspects of the present invention are to address at least the above-mentioned problems and/or disadvantages and to provide at least the advantages described below. Accordingly, an aspect of the present invention is to provide a method and apparatus that can ensure the integrity of the normal world using hardware mechanisms of the secure world.

Another aspect of the present invention is to provide a method that reports a breach of the integrity of the entities involved in the boot process of a mobile terminal.

In accordance with an exemplary embodiment of the present invention, a method for integrity protection in a mobile terminal that has a secure world preventing unauthorized access to resources and a normal world other than the secure world is provided. The method includes sensing power-on of the mobile terminal, verifying, by a trusted entity in the normal world, integrity of a first subsequent entity, and sending, when an integrity breach is detected in the first subsequent entity, by the trusted entity, a modification indication signal to the secure world.

In accordance with another exemplary embodiment of the present invention, an apparatus for integrity protection in a mobile terminal is provided. The apparatus includes a memory unit having a secure world preventing unauthorized access to resources and a normal world other than the secure world, a boot manager for controlling a boot process after sensing power on, and a secure world manager for controlling a process of verifying, by a trusted entity in the normal world, integrity of a first subsequent entity, and sending, when an integrity breach is detected in the first subsequent entity, by the trusted entity, a modification indication signal to the secure world.

In accordance with another exemplary embodiment of the present invention, a method of integrity verification in a mobile terminal that has a secure world preventing unauthorized access to resources and a normal world other than the secure world is provided. The method includes verifying, in sequence, the integrity of a bootloader, a kernel, an initialization process, an Integrity Check Daemon (ICD), an integrity checklist, and modules in the integrity checklist.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It is to be understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
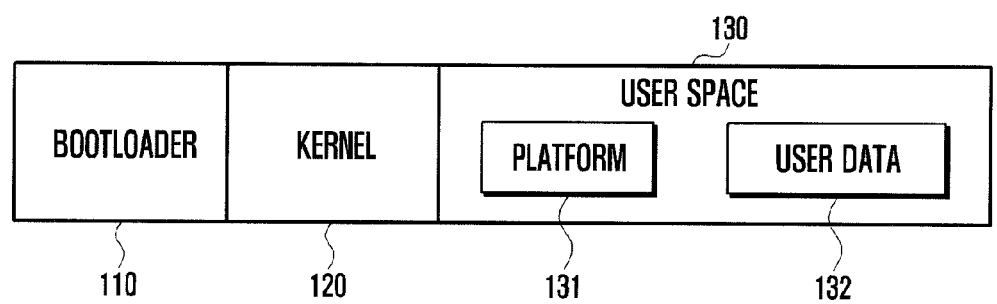
FIG. 1 illustrates a binary file format in a memory of a mobile terminal according to the related art.

FIG. 1 illustrates a binary file format in a memory of a mobile terminal according to the related art.

Referring to FIG. 1, the binary file format is composed of sections for a bootloader 110, a kernel 120 and a user space 130. The user space 130 includes regions for a platform 131 (such as Google's Android platform) and user data 132 (such as user applications).

In secure boot, an initially verified entity verifies the next entity and boots the same if not modified. For example, referring to FIG. 1, the bootloader signature stored in the hardware ensures integrity of the bootloader 110, and the bootloader 110 checks whether the kernel 120 is modified.

A mobile terminal of the related art boots without any special action even if a kernel modification is detected. That is, a secure boot process of the related art tends to be incomplete.

In the case of Google's Android platform, as the Android code is open-source, a kernel binary or platform binary that has been customized by a third party may be installed in a mobile terminal, which then normally boots. Attackers abusing weaknesses in the open-source Android code continuously devise new rooting techniques. Consequently, the Linux kernel, Android platform and Android applications in mobile terminals may be modified through customized Read-Only Memory (ROM) and rooting.

Malicious code (i.e., malware) may be installed in a mobile terminal having an unsecure boot process. Such malware may disturb normal operations and allow for personal or financial information of the user to be stolen. Such code may also override Digital Rights Management (DRM) features enforcing proper payment for digital content. To deal with this problem, exemplary embodiments of the present invention provide a method that can ensure the integrity of individual entities in a mobile terminal.

Figure 2:
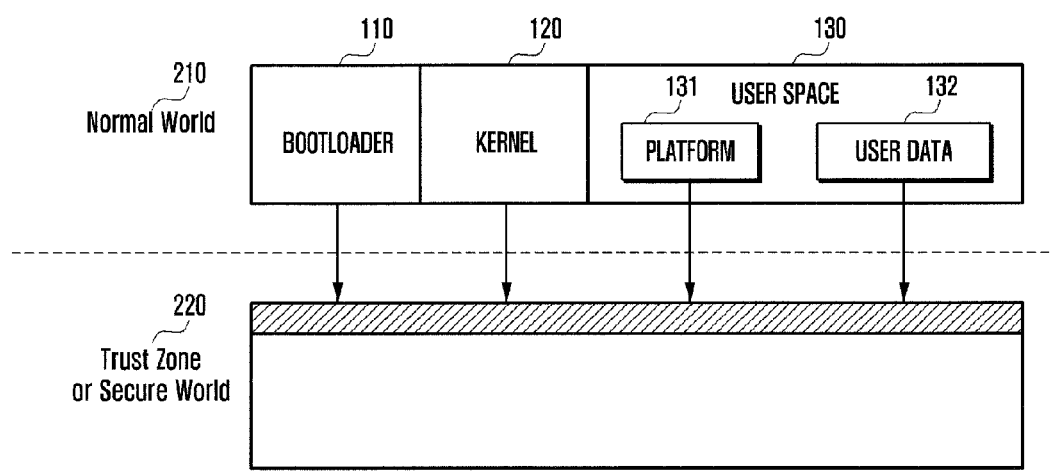
FIG. 2 illustrates a boot process according to an exemplary embodiment of the present invention.

FIG. 2 illustrates a boot process according to an exemplary embodiment of the present invention.

Referring to FIG. 2, the memory area of a mobile terminal is divided into a normal world 210 and a secure world (or a trust zone) 220.

The secure world 220 is a zone protected by hardware mechanisms and is physically separated from the normal world 210. Unauthorized access to resources in the secure world 220 is prevented. The normal world 210 indicates any zone other than the secure world 220. For example, the Linux kernel and Android platform are included in the normal world 210.

In the boot process, each entity such as the bootloader 110, the kernel 120, the platform 131 and the user data 132 of the user space 130 may verify the integrity of the next entity, and notify the secure world 220 when a modification is detected.

When the mobile terminal is powered on, it compares a value recorded in hardware with a value derived from the bootloader binary. When the values match each other, the bootloader 110 is executed. The bootloader 110 verifies the integrity of the kernel 120. Here, integrity verification may include checking whether a corresponding signature written by the manufacturer or authorized third party has been modified. In the following description, reference to integrity verification and checking signature modification may be used interchangeably.

When the kernel 120 is modified, the bootloader 110 sends a modification indication signal to the secure world 220. Then, a modification indication signal may be sent to the trust zone OS (or controller) preventing unauthorized access to the secure world 220.

When the kernel 120 is not modified or after sending a modification indication signal, the kernel 120 may verify the integrity of the platform 131 (the next entity) and send a modification indication signal if modified.

The platform 131 and subsequent entities repeat a similar procedure.

As described above, in exemplary embodiments of the present invention, entities configured in the memory of a mobile terminal may be chained in sequence and the secure world 220 may be notified of the integrity verification result of each entity. Hence, the integrity of major modules of the mobile terminal may be protected.

Figure 3:
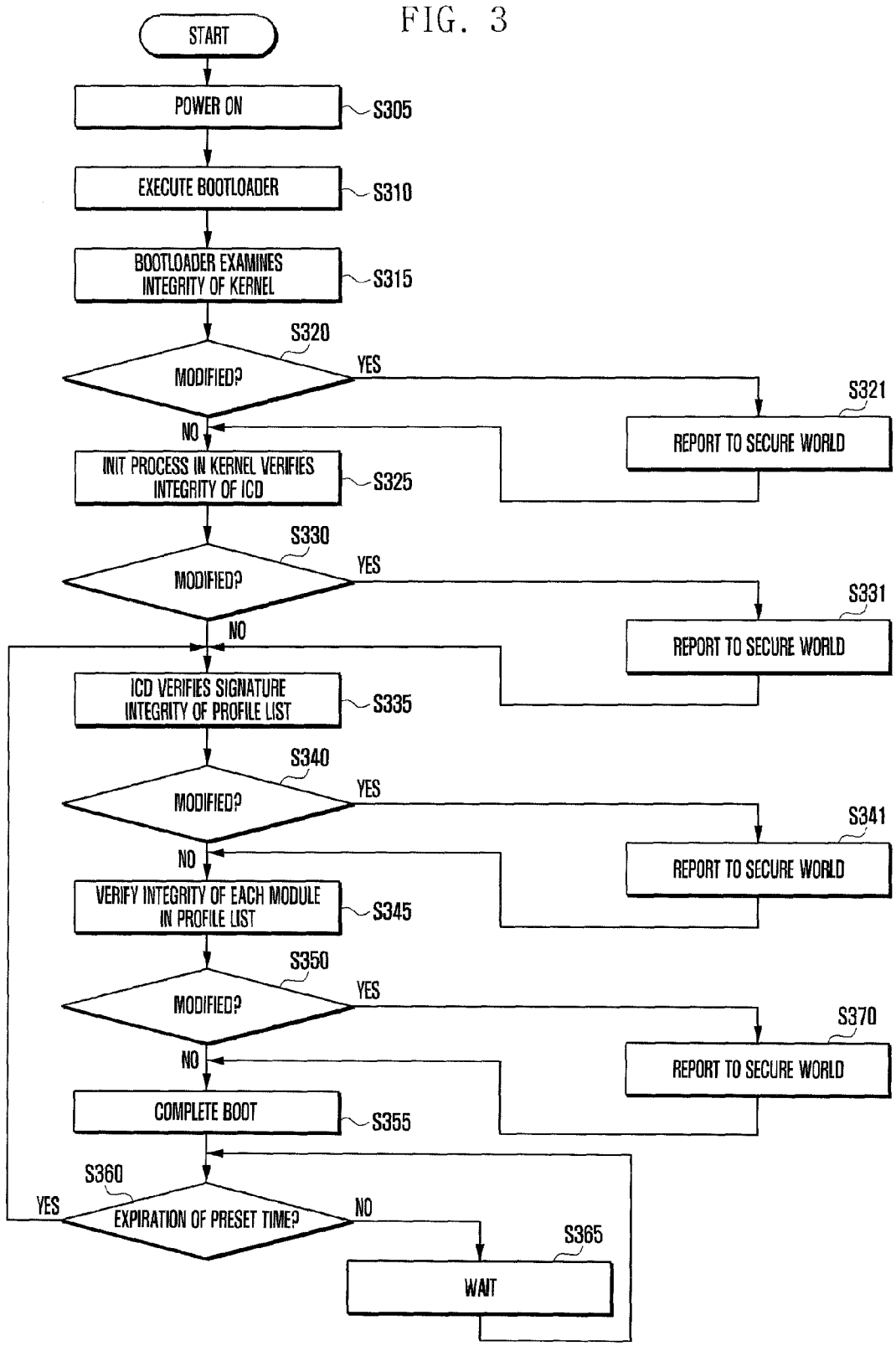
FIG. 3 is a flowchart of an integrity protection method according to an exemplary embodiment of the present invention.

FIG. 3 is a flowchart of an integrity protection method according to an exemplary embodiment of the present invention.

Referring to FIG. 3, when the mobile terminal is powered on in step S305, it compares a value recorded in hardware with a value derived from the bootloader binary. When the values match, the mobile terminal executes the bootloader in step S310.

The bootloader examines the integrity of the kernel (namely, it checks whether the signature attached to the kernel is modified) in steps S315 and S320. When the kernel is modified, the bootloader sends a modification indication signal to the secure world in step S321. In one exemplary embodiment of the present invention, the modification indication signal may be recorded as a value of '1' at a preset memory location included in the secure world. Later, when a different application or entity finds a value of 1 at the memory location, it may determine that the integrity of the mobile terminal has not been maintained.

When the kernel is not modified, the bootloader executes the kernel and the initialization (herein also "Init") process in the kernel verifies the integrity of the Integrity Check Daemon (ICD) module in steps S325 and S330. When the ICD module is modified, the Init process sends a modification indication signal to the secure world in step S331.

When the ICD module is not modified, the Init process executes the ICD module and the ICD module verifies the integrity of a profile list (e.g., an integrity checklist) in steps S335 and S340. When the profile list is modified, the ICD module sends a modification indication signal to the secure world in step S341.

When the profile list is not modified, the ICD module verifies the integrity of each module enrolled in the profile list in steps S345 and S350. For example, the ICD module checks whether shared libraries or executable files enrolled in the profile list are modified. When a modified module is found, the ICD module sends a modification indication signal to the secure world in step S370.

When no modified module is found, the mobile terminal completes the boot process in step S355. Thereafter, the mobile terminal transitions to the wait state in step S365, and is ready to process user requests.

In the boot process described above, a preceding entity verifies the integrity of a following entity and notifies, when the following entity is modified, modification to the secure world. However, this is not limited only to the boot process. That is, integrity check may also be performed at regular intervals after booting.

To achieve this, the mobile terminal checks whether a preset time has expired after booting in step S360. That is, the mobile terminal attempts to detect signature modification in entities after booting.

When the preset time has expired after booting, the mobile terminal returns to step S335 and repeats the integrity check of the profile list and modules enrolled therein.

Figure 4:
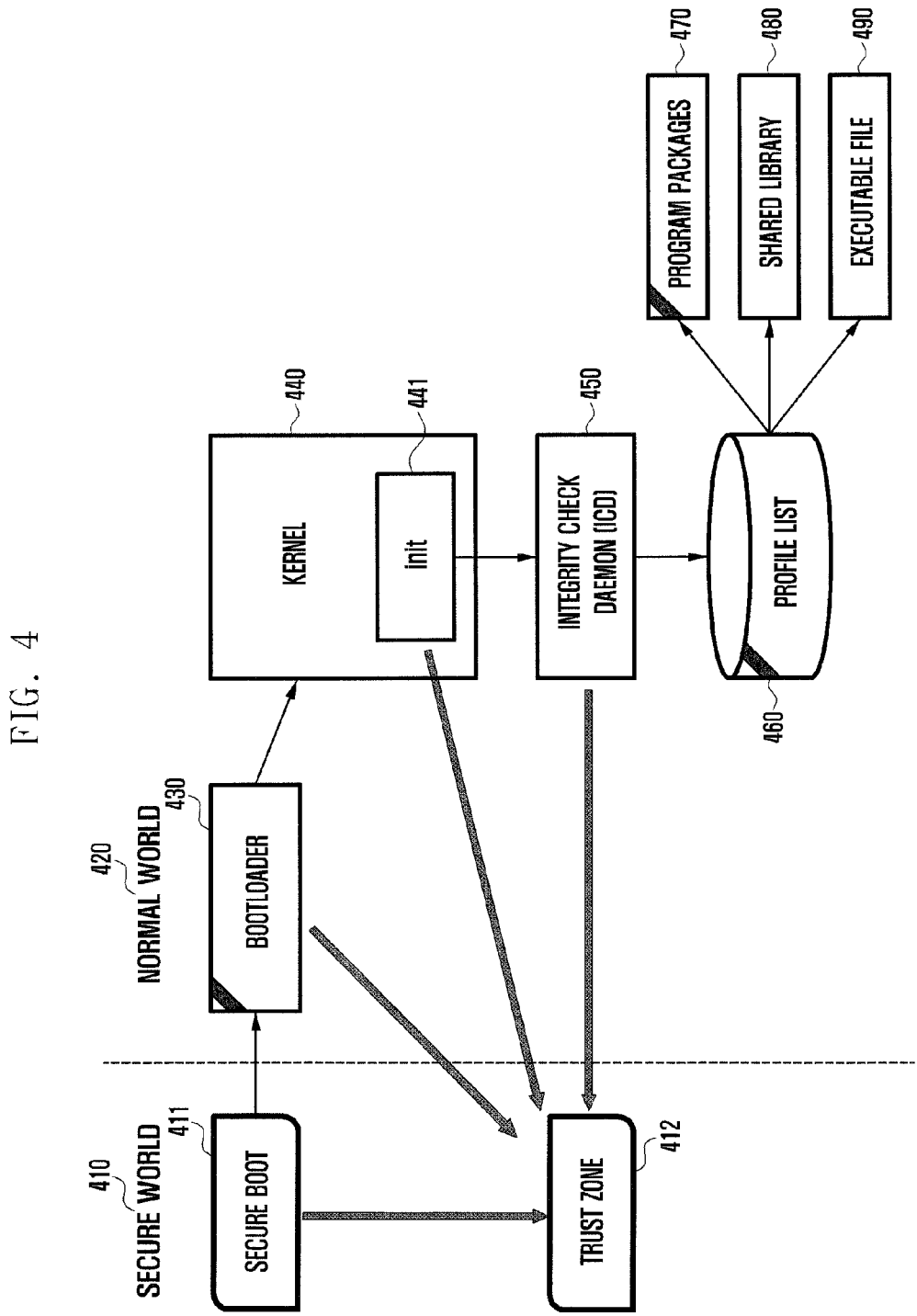
FIG. 4 illustrates an integrity check process according to an exemplary embodiment of the present invention.

FIG. 4 illustrates an integrity check process according to an exemplary embodiment of the present invention.

Referring to FIG. 4, as described before, the memory area of the mobile terminal may be divided into a secure world 410 and a normal world 420 (the meanings of secure world and normal world are described above). The secure world 410 includes a secure boot zone 411 and a trust zone 412. Trust zone 412 may be viewed as substantially the same as the secure world 410 or as a portion thereof.

In the boot process, trusted bootloader 430 verifies the integrity of the kernel 440 and sends, when a modification is detected, a modification indication signal to the trust zone 412. The kernel 440 verifies the integrity of the Init process 441 and sends, when a modification is detected, a modification indication signal to the trust zone 412.

The Init process 441 verifies the integrity of the ICD 450 and sends, when a modification is detected, a modification indication signal to the trust zone 412. When a modification is not detected, the Init process 441 executes the ICD 450.

The ICD 450 verifies the integrity of the profile list 460, program packages 470, shared libraries 480 and executable files 490 enrolled in the profile list 460. When modification is detected, the ICD 450 sends a modification indication signal to the trust zone 412.

Figure 5:
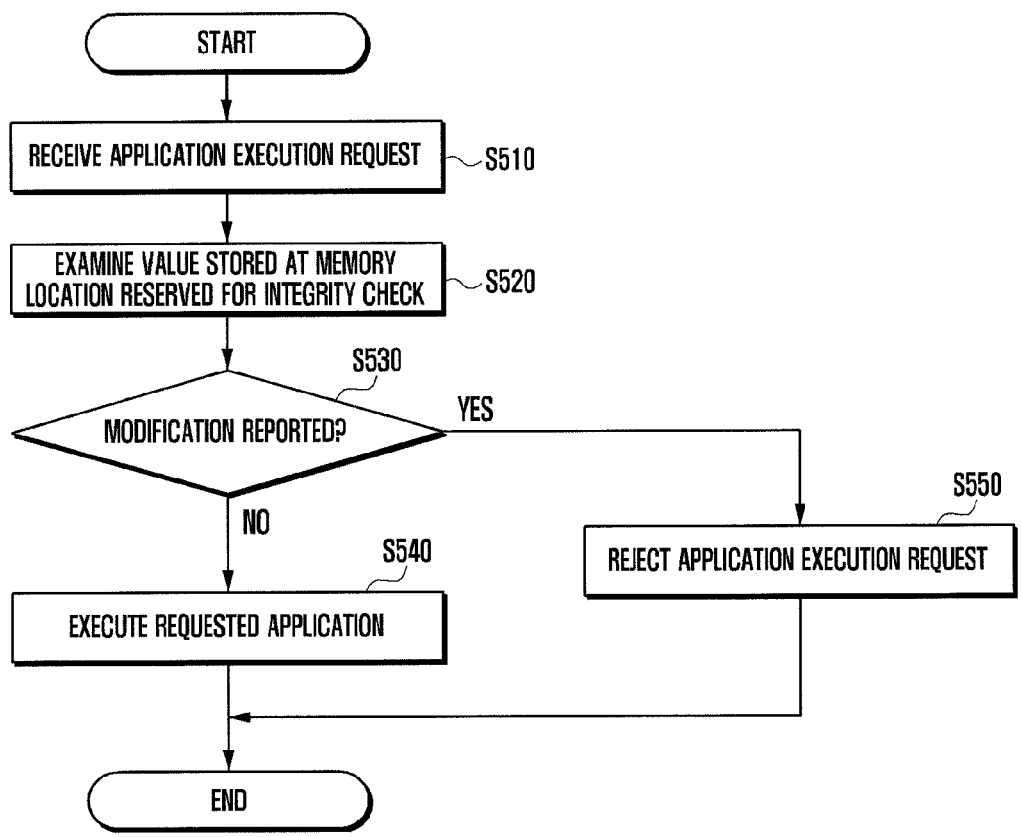
FIG. 5 is a flowchart of a procedure for application handling according to integrity check results according to an exemplary embodiment of the present invention.

FIG. 5 is a flowchart of a procedure for application handling according to integrity check results according to an exemplary embodiment of the present invention.

Referring to FIG. 5, when the mobile terminal receives an execution request for an application in step S510, it examines the value stored at a memory location reserved for integrity check in step S520.

The mobile terminal checks whether the value indicates an occurrence of a modification indication signal in step S530. Here, when the value stored at the reserved memory location is '1', this indicates that at least one modification indication signal has been reported (i.e., integrity of the mobile terminal is not maintained).

When the value indicates the occurrence of a modification indication signal, the mobile terminal rejects the application execution request in step S550.

When the value indicates a non-occurrence of a modification indication signal, the mobile terminal executes the requested application in step S540.

Figure 6:
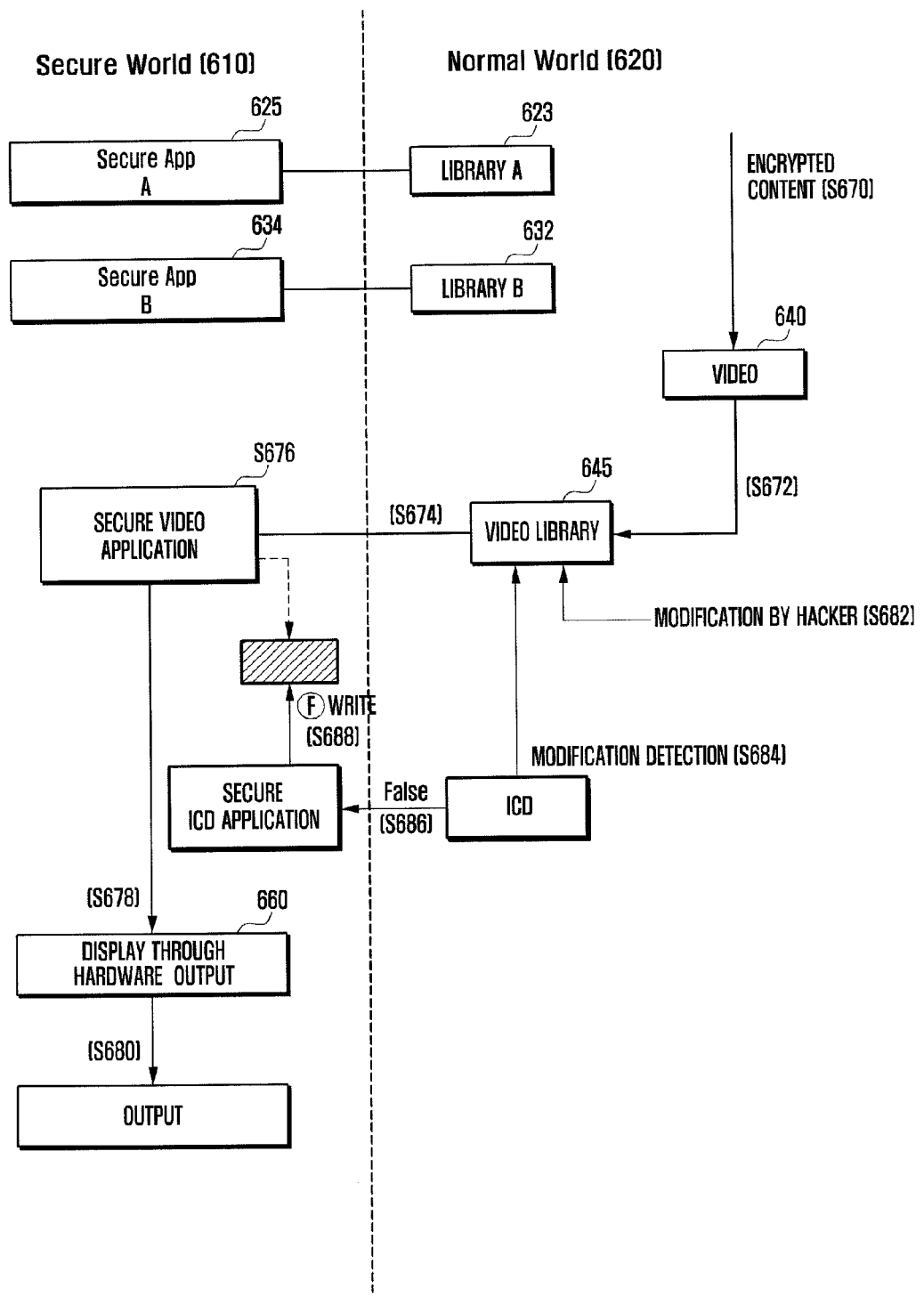
FIG. 6 illustrates an application handling process that allows or rejects application execution according to integrity check results according to an exemplary embodiment of the present invention.

FIG. 6 illustrates an application handling process that allows or rejects application execution according to an integrity check result according to an exemplary embodiment of the present invention.

Referring to FIG. 6, the memory area of the mobile terminal may be divided into a secure world 610 and a normal world 620. A typical application comprises a secure world part and a normal world part. For example, an application A is composed of a secure application A 625 in the secure world 610 and a library A 623 in the normal world 620. In this case, a request received by the library A 623 in the normal world 620 is forwarded to the secure application A 625 in the secure world 610, and the secure application A 625 actually processes the request by controlling the hardware.

The above description of application A also applies to an application B. Application B may also comprise a secure application B 634 in the secure world 610 and a library B 632 in the normal world 620.

Below is a description of a scenario in which a video application plays back encrypted content with reference to FIG. 6.

A description is now given of a case in which the integrity of the mobile terminal is maintained (that is, a signature modification is not detected during the boot process or through a periodic integrity check).

A video application 640 receives encrypted content in step S670. The video application 640 sends a playback request for the received content to a video library 645 in step S672. The video library 645 forwards the playback request to a secure video application 650 in step S674. The secure video application 650 checks whether the value stored at a memory location reserved for integrity check is '1' (i.e., denoting the occurrence of a modification indication signal) in step S676. When the value stored at the reserved memory location is not '1', the secure video application 650 sends the content data to a display unit 660 in step S678. The display unit 660 outputs the content data in step S680.

Assume that the signature attached to the video library 645 is falsified by a hacker at step S682. The ICD module detects a signature modification in the video library 645 through periodic integrity check in step S684, and sends a modification indication signal (False) to a secure ICD application in step S686. The secure ICD application writes a value of 1 at the memory location reserved for the integrity check in step S688. The value of 1 at the reserved memory location indicates a falsification of a signature attached to an entity in the mobile terminal.

Thereafter, when a playback request for the content is received, the secure video application 650 checks the value stored at the reserved memory location in step S690. As the value is set to '1', the secure video application 650 rejects the playback request.

Figure 7:
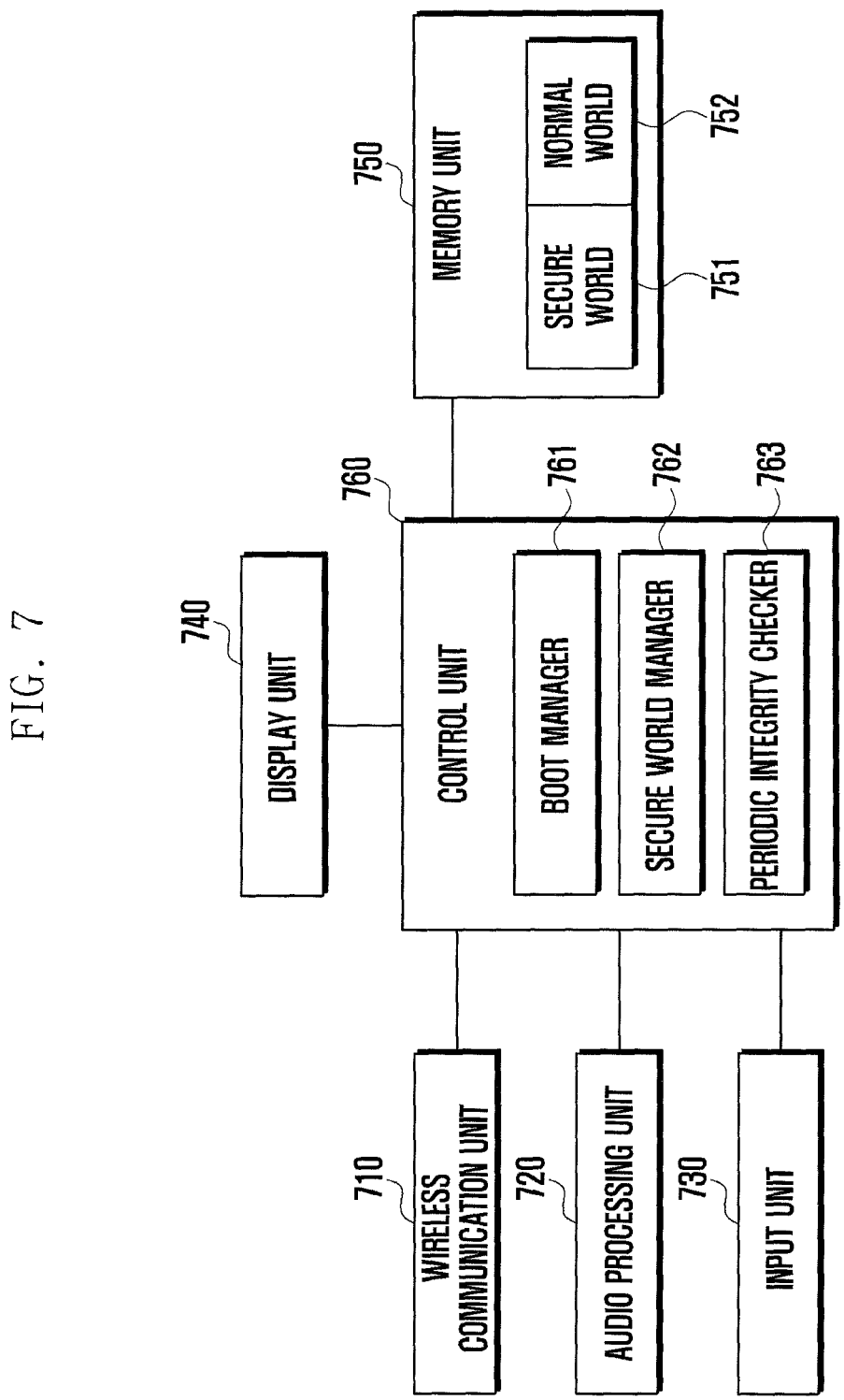
FIG. 7 is a block diagram of a mobile terminal according to an exemplary embodiment of the present invention.

FIG. 7 is a block diagram of a mobile terminal according to an exemplary embodiment of the present invention.

Referring to FIG. 7, the mobile terminal may include a wireless communication unit 710, an audio processing unit 720, an input unit 730, a display unit 740, a memory unit 750, and a control unit 760.

The wireless communication unit 710 performs data transmission and reception through wireless communication. The wireless communication unit 710 may include a Radio Frequency (RF) transmitter for upconverting the frequency of a signal to be transmitted and amplifying the signal, and an RF receiver for low-noise amplifying a received signal and downconverting the frequency of the received signal. The wireless communication unit 710 may forward data received through a wireless channel to the control unit 760, and transmit data from the control unit 760 through the wireless channel. Here, the wireless communication unit 710 is a module that is present only when the mobile terminal supports wireless communication. That is, the mobile terminal of the present invention may or may not include a specific component listed above depending upon configuration.

The audio processing unit 720 may include a coder/decoder (codec). The codec may have a data codec for processing packet data and the like, and an audio codec for processing an audio signal such as a voice signal. The audio processing unit 720 converts a digital audio signal into an analog audio signal through the audio codec to reproduce the analog audio signal using a speaker, and converts an analog audio signal from a microphone into a digital audio signal through the audio codec.

The input unit 730 generates an input signal corresponding to key manipulation of the user wishing to control the mobile terminal and sends the input signal to the control unit 760. The input unit 730 may include a keypad including numeric and direction keys, and function keys attached to sides of the mobile terminal. When the mobile terminal can be operated using only a touchscreen, the input unit 730 may be excluded.

The display unit 740 may be realized using Liquid Crystal Display (LCD) devices, Organic Light Emitting Diodes (OLED), or Active Matrix Organic Light Emitting Diodes (AMOLED). The display unit 740 provides various pieces of information to the user in visual form, such as menus, input data and function-setting data. The display unit 740 may output a boot screen, an idle screen, a menu screen, a call handling screen and other application screens.

The memory unit 750 stores programs and data needed for operation of the mobile terminal, and may include a program area and a data area. The program area stores an operating system that boots the mobile terminal and controls the overall operation thereof, application programs for playing back multimedia content, other application programs related to a camera, sound reproduction, and playback of still or moving images. The data area is an area that stores data generated in the course of using the mobile terminal, and may store multimedia content such as images, moving images, phonebooks and audio data. The memory unit 750 may include volatile and non-volatile memory devices.

The memory unit 750 may include a secure world 751 and a normal world 752. The secure world 751 is protected by hardware mechanisms and is physically separated from the normal world 752. Unauthorized access to resources in the secure world 751 is prevented to maintain integrity. The normal world 752 is any region other than the secure world 751.

The control unit 760 controls overall operation of the mobile terminal. To protect the integrity of the mobile terminal, the control unit 760 may include a boot manager 761, a secure world manager 762, and a periodic integrity checker 763.

The boot manager 761 manages the boot process of the mobile terminal after power on.

The secure world manager 762 resides at the boundary between the secure world 751 and the normal world 752, and acts as a controller that prevents unauthorized access from the normal world 752 to resources in the secure world 751.

The secure world manager 762 controls the integrity check operation so that a trusted first entity verifies the integrity of a second entity in the boot chain and sends a modification indication signal to the secure world 751 when a modification is detected in the second entity. Here, the trusted first entity verifies integrity of the second entity by checking whether the signature attached to the second entity is falsified.

When a modification is not detected in the second entity, the secure world manager 762 controls the second entity to verify integrity of a third entity.

When an execution request for an application is received, the secure world manager 762 checks whether a modification indication signal has been generated, and may control an operation to reject the execution request when a modification indication signal has been generated.

The periodic integrity checker 763 checks integrity of essential entities at regular intervals during normal operation of the mobile terminal after booting.

In exemplary embodiments of the present invention, the integrity of essential entities in the normal world can be ensured. This may contribute to enhanced effectiveness of DRM features and security services. User convenience may also be enhanced.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for integrity protection in a mobile terminal that has a secure world preventing unauthorized access to resources and a normal world other than the secure world, the method comprising:
   sensing, by the mobile terminal, a power-on of the mobile terminal;
   verifying, by a trusted entity in the normal world of the mobile terminal, an integrity of entities including a kernel, an initialization process, an Integrity Check Daemon (ICD), an integrity checklist of target modules and target modules included in the integrity checklist, the verifying being performed in the normal world to indicate whether or not the integrity of the entities can be verified;
   determining whether an integrity breach is detected in one entity of the entities by the trusted entity;
   generating, if the integrity breach is detected in the one entity, a modification indication signal to indicate that the integrity breach is detected in the one entity; and
   sending, by the trusted entity, if the integrity breach is detected in the one entity, the modification indication signal to the secure world of the mobile terminal.

2. The method of claim 1, further comprising verifying, by the one entity when the integrity breach is not detected in the one entity, an integrity of a subsequent entity of the entities in the normal world.

3. The method of claim 1, further comprising:
   determining whether a preset time has expired after a boot of the mobile terminal; and
   repeating, when the preset time has expired after the boot, an integrity check operation.

4. The method of claim 1, further comprising:
   checking, when an execution request for an application is made, whether the modification indication signal is received by the secure world of the mobile terminal; and
   rejecting, when the modification indication signal is received, the execution request.

5. The method of claim 1, wherein the verifying of the integrity comprises checking whether a signature attached to the one entity is falsified.

6. The method of claim 1, wherein the verifying of the integrity comprises verifying, by a bootloader, the integrity of the kernel.

7. The method of claim 6, wherein the verifying of the integrity of the kernel comprises verifying, by the kernel, the integrity of the ICD.

8. The method of claim 7, wherein the verifying of the integrity of the ICD comprises verifying, by the ICD, the integrity of the integrity checklist of target modules.

9. The method of claim 8, wherein the verifying of the integrity of the integrity checklist comprises verifying, by the ICD, the integrity of the target modules included in the integrity checklist.

10. An apparatus for integrity protection in a mobile terminal, the apparatus comprising:
a memory unit including a secure world preventing unauthorized access to resources and a normal world other than the secure world; and
a controller including:
a processor;
a boot manager configured to control a boot process after sensing a power on of the mobile terminal; and
a secure world manager configured to control a process of:
verifying, by a trusted entity in the normal world of the memory unit, an integrity of entities including a kernel, an initialization process, an Integrity Check Daemon (ICD), an integrity checklist of target modules and target modules included in the integrity checklist, the verifying being performed in the normal world to indicate whether or not the integrity of the entities can be verified,
determining whether an integrity breach is detected in one entity of the entities by the trusted entity,
generating, if the integrity breach is detected in the one entity, a modification indication signal to indicate that the integrity breach is detected in the one entity, and
sending, by the trusted entity, if the integrity breach is detected in the one entity, the modification indication signal to the secure world of the memory unit.

11. The apparatus of claim 10, wherein the secure world manager is further configured to control, when the integrity breach is not detected in the one entity, the one entity to verify an integrity of a subsequent entity of the entities in the normal world.

12. The apparatus of claim 10, further comprising a periodic integrity checker configured to control an operation so that a preceding entity of the entities in the normal world checks an integrity of a subsequent entity of the entities in the normal world at regular intervals after a boot.

13. The apparatus of claim 10, wherein the secure world manager is further configured to control a process of checking whether the modification indication signal is received by the secure world when an execution request for an application is made, and rejecting the execution request when the modification indication signal is received.

14. The apparatus of claim 10, wherein the secure world manager is further configured to verify the integrity of the one entity by checking whether a signature attached to the one entity is falsified.

15. The apparatus of claim 10, wherein the secure world manager is further configured to control a bootloader to verify the integrity of the kernel.

16. The apparatus of claim 15, wherein the secure world manager is further configured to control the kernel to verify the integrity of the ICD.

17. The apparatus of claim 16, wherein the secure world manager is further configured to control the ICD to verify the integrity of the integrity checklist of target modules.

18. The apparatus of claim 17, wherein the secure world manager is further configured to control the ICD to verify the integrity of the target modules included in the integrity checklist.

19. A method of integrity verification in a mobile terminal that has a secure world preventing unauthorized access to resources and a normal world other than the secure world, the method comprising:
verifying, by the mobile terminal in sequence, an integrity of a bootloader, a kernel, an initialization process, an Integrity Check Daemon (ICD), an integrity checklist, and modules included in the integrity checklist;
determining whether an integrity breach is detected in one of the bootloader, the kernel, the initialization process, the ICD, the integrity checklist and the modules;
generating, if the integrity breach is detected, a modification indication signal to indicate that the integrity breach is detected in one of the bootloader, the kernel, the initialization process, the ICD, the integrity checklist and the modules; and
sending, if the integrity breach is detected, the modification indication signal to the secure world of the mobile terminal,
wherein each of the bootloader, the kernel, the initialization process, the ICD, the integrity checklist and the modules included in the integrity checklist is an entity of the normal world of the mobile terminal, and
wherein, the integrity of the kernel is verified by the verified bootloader, the integrity of the initialization process is verified by the verified kernel, the integrity of the ICD is verified by the verified initialization process, and the integrity of the integrity checklist is verified by the verified ICD verifying an integrity of the target modules included in the integrity checklist.

* * * * *